(12) United States Patent
Haerter et al.

(10) Patent No.: US 10,126,727 B2
(45) Date of Patent: Nov. 13, 2018

(54) METHOD AND SYSTEM FOR SAFELY SWITCHING OFF AN ELECTRICAL LOAD

(71) Applicant: PILZ GMBH & CO. KG, Ostfildern (DE)

(72) Inventors: Michael Haerter, Ostfildern (DE); Dietmar Seizinger, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 168 days.

(21) Appl. No.: 15/219,626

(22) Filed: Jul. 26, 2016

(65) Prior Publication Data
US 2016/0334775 A1 Nov. 17, 2016

Related U.S. Application Data

(63) Continuation of application No. PCT/EP2015/051674, filed on Jan. 28, 2015.

(30) Foreign Application Priority Data

Jan. 28, 2014 (DE) .................. 10 2014 100 970

(51) Int. Cl.
*G06F 1/32* (2006.01)
*G05B 19/042* (2006.01)
(Continued)

(52) U.S. Cl.
CPC .......... *G05B 19/0428* (2013.01); *G05B 9/02* (2013.01); *G05B 9/03* (2013.01); *G05B 19/058* (2013.01);
(Continued)

(58) Field of Classification Search
CPC .......... G06B 2219/14012; G05B 2219/14014; G05B 2219/24003; G05B 2219/24008;
(Continued)

(56) References Cited

U.S. PATENT DOCUMENTS

| 6,611,722 | B2 | 8/2003 | Behr et al. |
| 6,957,115 | B1 | 10/2005 | Meyer-Gräfe et al. |

(Continued)

FOREIGN PATENT DOCUMENTS

| DE | 197 42 716 A1 | 4/1999 |
| DE | 199 27 635 B4 | 10/2009 |

(Continued)

OTHER PUBLICATIONS

ZVEI: Automation; Safety of machinery—Notes on the application of standards EN 62061 and EN ISO 13849-1; Jun. 2007; 19 pp.

(Continued)

*Primary Examiner* — Jaweed A Abbaszadeh
*Assistant Examiner* — Volvick Derose
(74) *Attorney, Agent, or Firm* — Harness, Dickey & Pierce, P.L.C.

(57) ABSTRACT

A method and system for safely switching off an electrical load in a system comprising a multi-channel control unit, a single-channel data transmission path and an output unit having a first processing unit, a second processing unit and safe outputs. The method comprises receiving and evaluating an input signal by the multi-channel control unit and generating an enable signal based on the evaluation; transmitting the enable signal to the output unit via the single-channel data transmission path; receiving the enable signal by the first processing unit and generating an output signal based on the enable signal; providing at least one part of the enable signal from the first processing unit to the second processing unit for evaluation therewith; generating a dynamic clock signal by the second processing unit based on the enable signal; and controlling the safe outputs based on the output signal and the dynamic clock signal.

11 Claims, 5 Drawing Sheets

(51) Int. Cl.
*G05B 9/02* (2006.01)
*G05B 19/05* (2006.01)
*G05B 9/03* (2006.01)

(52) U.S. Cl.
CPC .. *G06F 1/3287* (2013.01); *G05B 2219/14012* (2013.01); *G05B 2219/14014* (2013.01); *G05B 2219/24003* (2013.01); *G05B 2219/24008* (2013.01); *G05B 2219/24184* (2013.01); *G06F 1/3203* (2013.01)

(58) Field of Classification Search
CPC ...... G05B 2219/24148; G05B 19/0428; G05B 9/02; G05B 9/03; G05B 9/058; G06F 1/3287
USPC .......................................................... 713/323
See application file for complete search history.

(56) References Cited

U.S. PATENT DOCUMENTS

| | | | |
|---|---|---|---|
| 7,139,622 B2 | 11/2006 | Klopfer et al. | |
| 7,715,932 B2 | 5/2010 | Seizinger | |
| 2002/0180278 A1* | 12/2002 | Veil | G05B 9/02 307/326 |
| 2003/0030330 A1* | 2/2003 | Pullmann | G05B 9/03 307/328 |
| 2006/0138310 A1* | 6/2006 | Krieg | B21D 55/00 250/221 |
| 2006/0190101 A1* | 8/2006 | Seizinger | G05B 19/4184 700/79 |
| 2008/0278875 A1* | 11/2008 | Bauer | G05B 9/02 361/65 |
| 2010/0235682 A1 | 9/2010 | Yoshida et al. | |
| 2011/0016362 A1* | 1/2011 | Holzaepfel | H04L 43/0852 714/51 |
| 2011/0045857 A1* | 2/2011 | Ineichen | G08C 17/02 455/507 |
| 2013/0033412 A1* | 2/2013 | Godau | G08C 17/02 343/852 |
| 2013/0079902 A1* | 3/2013 | Kamenetz | G05B 19/0421 700/82 |
| 2013/0113304 A1* | 5/2013 | Pullmann | H01H 47/005 307/326 |
| 2013/0166799 A1* | 6/2013 | Godau | H04L 12/40019 710/107 |
| 2013/0264890 A1* | 10/2013 | Le | G05B 9/02 307/143 |
| 2014/0330397 A1* | 11/2014 | Kamenetz | G05B 15/02 700/12 |
| 2015/0053514 A1* | 2/2015 | Unsin | B66D 5/14 188/161 |
| 2015/0134865 A1 | 5/2015 | Godau et al. | |

FOREIGN PATENT DOCUMENTS

| | | |
|---|---|---|
| DE | 10 2010 054 386 B3 | 2/2012 |
| DE | 10 2012 107 717 B3 | 9/2013 |
| EP | 1 620 768 B1 | 2/2003 |
| EP | 1 362 269 B1 | 11/2003 |
| EP | 2 228 699 A2 | 9/2010 |
| WO | WO 2014/012976 A1 | 1/2014 |

OTHER PUBLICATIONS

English translation of International Preliminary Report on Patentability (Chapter 1); dated Aug. 2, 2016; 12 pp.
International Search Report for PCT/EP2015/051674; dated Apr. 28, 2015; 2 pp.

* cited by examiner

METHOD AND SYSTEM FOR SAFELY SWITCHING OFF AN ELECTRICAL LOAD

CROSS-REFERENCES TO RELATED APPLICATIONS

This application is a continuation of international patent application PCT/EP2015/051674, filed on Jan. 28, 2015 designating the U.S., which international patent application has been published in German language as WO 2015/113994 A1 and claims priority from German patent application DE 10 2014 100 970.3, filed on Jan. 28, 2014. The entire contents of these applications are incorporated herein by reference.

BACKGROUND OF THE INVENTION

The present disclosure relates to a method for safely switching off an electrical load, a corresponding system for this purpose, and an output unit in said system.

The disclosure generally relates to the field of safe automation, in particular the control and monitoring of safety-critical processes. Safety-critical processes in the sense of the present disclosure are technical sequences, relationships and/or events during which error-free operation must be ensured in order to avoid any risk to persons or material objects of value. This involves, in particular, the monitoring and control of operations which take place in an automated manner in the field of mechanical and plant engineering in order to avoid accidents. Typical examples are the protection of a pressing plant, the protection of robots operating in an automated manner or the safeguarding of a harmless state for maintenance work on a technical plant.

For such processes, the EN ISO 13839-1 and EN/IEC 62061 standards sets levels which, on the one hand, specify the ability of safety-related parts of a controller to carry out a safety function under foreseeable conditions and, on the other hand, indicate the safety integrity of the safety functions assigned to the process. The former is the so-called performance level (PL) with levels from a to e, where e is the highest level. With regard to the specification of the safety integrity, safety integrity levels (SIL) with the levels 1 to 3 are specified, where an SIL3 is the highest level. The present disclosure relates to safety-critical processes for which at least a performance level d and a safety integrity level 2 must be complied with.

Controllers having spatially remote input and output (I/O) units, which are connected to one another via a data transmission path, in particular via a so-called field bus, are increasingly being used for process control. Sensors for recording process data and actuators for carrying out control operations are connected to the input and output units. Typical sensors in the field of safety technology are emergency off switches, guard doors, two-hand switches, rev counters or light barrier arrangements. Typical actuators are, for example, contactors which can be used to switch off the drives of a plant being monitored. In such an arrangement, the input and output units are used substantially as spatially distributed signal sensor and signal output stations, whereas the process data are actually processed and control signals for the actuators are generated by a superordinate control unit, for example a programmable logic controller (PLC).

In order to be able to control safety-critical processes using a bus-based system, the transmission of data from the input and output units to the control unit must be made failsafe. In particular, it must be ensured that a hazardous state cannot occur in the overall plant as a result of transmitted process data being lost, repeated, corrupted, inserted or changed and/or as a result of a fault in a remote input and output unit.

DE 197 42 716 A1 discloses a system in which the transmission path is protected by virtue of so-called safety-related devices being present both in the superordinate control unit and in the remote input and output unit. This involves, for example, the redundant design of all signal receiving, signal processing and signal output paths. Safe switching off can therefore be initiated both by a superordinate control unit and by the remote units, thus making it possible to ensure failsafe switch off independently of the transmission of data. The safety function is therefore independent of the transmission technology used or the structure of the bus system. However, since the input and output units themselves undertake control functions by means of the safety-related devices, the units are complex and expensive and are not suitable for systems in which a plurality of actuators have to be safely controlled. In addition, with this approach, complete intrinsic fail-safety must be demonstrated for the remote input and output units within the scope of the approval procedures. This is accordingly complicated and expensive.

An alternative approach involves configuring the remote input and output units to be "non-failsafe" and instead implementing the data transmission path with two channels, that is to say with two separate signal paths. In this case, the superordinate control unit which has a failsafe design has the possibility of accessing the process data and carrying out the necessary error checking in two channels. The input and output units themselves may have a single-channel design in this approach, but the amount of cabling is increased since an additional separate line is needed for each I/O unit for a redundant design of the data transmission path.

Alternatively, a safe transmission with regard to machine safety can also be achieved via a single-channel data transmission path using appropriate protocols. One example of this is the SafetyBUS p standard developed by the applicant for failsafe field bus communication. SafetyBUS p is technologically based on the CAN field bus system, in which case additional mechanisms for protecting the transmission are added in layers 2 and 7 of the OSI reference system. In SafetyBUS p networks, only safety-related devices are used. In addition to safe multi-channel control, multi-channel input and output units are therefore used which multi-channeled redundantly process the data received from the safe controller at a logical level.

An intermediate route to the approaches described above is described by EP 1 620 768 B1 which discloses multiple transmission of the process data from the input units to a control unit via a single-channel transmission path. The diversitary transmission is intended to ensure failsafe reading at least for the input signals of the transmission path. In this case, the process data are coded with a variable, constantly changing keyword for transmission, thus producing determined dynamics of the process data which make it possible to redundantly evaluate input signals by means of a superordinate control unit. This makes it possible to dispense with a completely redundant design of the input units. However, a separate switch off path which is not routed via the field bus is still needed on the output side to ensure safe switching off independently of errors in the transmission. An additional line is therefore still required at least for output units having safe outputs.

DE 199 27 635 B4 discloses another possible way of implementing the intermediate route mentioned above. Therefore, an additional safety analyzer, which listens in on the flow of data between the control unit and the remote units on the transmission path and is designed to carry out safety-related functions, is inserted for the purpose of protecting a controller having remote input and output units. By monitoring, the safety analyzer can simultaneously read the data acquired by a sensor and can process said data by means of an internal logic unit. For the purpose of controlling the actuators, the safety analyzer possibly overwrites the data messages intended for an actuator from the control unit and inserts its own control data for the actuator. In this manner, the safety analyzer can control the connected actuators. However, an additional switch off path is also provided when using a safety analyzer in order to achieve a high safety category. This additional switch off path is provided by additional safe outputs which are locally arranged on the safety analyzer. The safety analyzer is therefore designed to be able to independently switch off a plant to be monitored without interchanging control data with a remote output unit for this purpose. This makes it possible to dispense with an additional switch off path routed via the output units, as a result of which the amount of cabling is not reduced, but rather shifted since the local safe outputs must also be connected to the plant to be monitored via additional lines.

The previously described concept of the safety analyzer has been implemented, for example, in AS-i SAFETY AT WORK. The AS interface (abbreviated to AS-i for actuator/sensor interface) is a standard for field bus communication developed to connect actuators and sensors with the aim of reducing parallel cabling. Safety-oriented components can be incorporated in an AS-i network using AS-i SAFETY AT WORK. Safety and standard components then operate in a parallel manner on the same cable, in which case an additional safety monitor monitors the safety-oriented components. The safety monitor has two-channel enable circuits for safety-oriented switch off. Safe switch off via a remote output unit is therefore also not possible with AS-i SAFETY AT WORK without additional local safe outputs on the safety analyzer.

SUMMARY OF THE INVENTION

Against this background, it is an object to provide an alternative method for safely controlling remote peripherals. It is further an object to provide a method which is simpler and more cost-effective. Yet further, it is an object to provide a method which does not require additional cabling and/or additional safety-oriented devices in order to safely control remote peripherals.

According to one aspect of the disclosure, this object is achieved by a method for safely switching off an electrical load in a system comprising a multi-channel control unit, a single-channel data transmission path and an output unit having a first processing unit, a second processing unit and safe outputs, the method comprising:
 receiving and evaluating an input signal by the multi-channel control unit and generating an enable signal based on the evaluation,
 transmitting the enable signal to the output unit via the single-channel data transmission path,
 receiving the enable signal by the first processing unit and generating an output signal based on the enable signal,
 providing at least one part of the enable signal from the first processing unit to the second processing unit for evaluation therewith,
 generating a dynamic clock signal by the second processing unit based on the enable signal, and
 controlling the safe outputs based on the output signal and the dynamic clock signal.

According to another aspect of the disclosure, the object is achieved by a system for safely switching off an electrical load, comprising a multi-channel control unit for receiving and evaluating an input signal, a single-channel data transmission path, and an output unit having a first processing unit, a second processing unit and safe outputs, wherein the multi-channel control unit is connected to the output unit via the single-channel data transmission path, wherein the multi-channel control unit is configured to generate an enable signal based on the input signal, wherein the single-channel data transmission path is configured to transmit the enable signal from the control unit to the output unit, wherein the first processing unit is configured to generate an output signal based on the enable signal and to also at least partially provide the enable signal to the second processing unit for evaluation therewith, wherein the second processing unit is configured to generate a dynamic clock signal based on the enable signal, and wherein the output unit is configured to control the safe outputs based on the output signal and the dynamic clock signal.

According to another aspect of the disclosure, the object is achieved by an output unit in a system for safely switching off an electrical load comprising a multi-channel control unit for receiving and evaluating an input signal and a single-channel data transmission path, the output unit having a first processing unit, a second processing unit and safe outputs, wherein the first processing unit is configured to generate an output signal based on an enable signal and to also at least partially provide the enable signal to the second processing unit for evaluation therewith, the enable signal being generated by the multi-channel control unit based on the evaluation of the input signal and being transmitted via the single-channel data transmission path from the multi-channel control unit to the output unit, wherein the second processing unit is configured to generate a dynamic clock signal based on the enable signal, and wherein the output unit is also configured to control the safe outputs based on the output signal and the dynamic clock signal.

A concept of the present disclosure is therefore to make it possible to safely switch off spatially remote peripherals from a central control unit via an output unit which is likewise remote. In this case, the remote output unit is connected to a multi-channel control unit only via a single-channel data transmission path. An additional switch off path or local safe outputs on the control unit are not required, yet nevertheless possible, in principle, for implementing a further switch off path. Furthermore, it is advantageously not necessary to design the output unit to have complete multi-channel redundancy. Rather, the disclosure suggests for a safe switching off to be enabled suitable signal processing within the output unit of an enable signal which is provided by the safe controller. The requirements imposed on the components required for this are lower than in the case of an output unit designed for complete multi-channel redundancy. An output unit according to the disclosure can therefore be produced in a more cost-effective manner.

In particular, compared to complete two-channel output units having complete mutual control, there is no need for any extensive consultation and synchronization between the processing units. The processing units process only the information relevant to them, such that the two processing units do not need to be provided with all information. In addition, it is sufficient if only one processing unit communicates with the control unit via the data transmission path, while the second processing unit receives the relevant data from the first processing unit. In addition to lower requirements of the hardware components, the software structure can also be advantageously simplified, thus also making it possible to achieve high performance with low-performance processing units.

The reduced requirements of the software and hardware advantageously also reduce the energy consumption of the output unit according to the disclosure in comparison with a complete two-channel solution. The reduced energy consumption and, in association therewith, a lower heat radiation are very important, in particular for remote output units which have to have a high international protection marking, for example IP67.

In addition, the method according to the disclosure advantageously does not require any additional requirements on the single-channel data transmission path, such that all common bus systems may be used. In this manner, existing systems can be easily retrofitted or expanded.

Overall, the novel method allows to reduce the costs in comparison with existing solutions since safe switching off can be ensured for high safety levels of the standards mentioned at the outset without having to use redundant cabling, additional safety-oriented devices with local safe outputs or output units with complete multi-channel redundancy.

The above-mentioned object is therefore completely achieved.

In a further refinement, the enable signal comprises a variable code and the second processing unit generates the dynamic clock signal based on the variable code.

According to this further refinement, an additional item of information in the form of a variable code is transmitted via the enable signal. The variable code can preferably encode at least two states which can be detected by the second processing unit. Depending on the state indicated by the variable code, the second processing unit is configured to generate the dynamic clock signal. In this manner, the control unit can advantageously signal which state should be assumed by the safe outputs independently of the first processing unit of the second processing unit.

In a particularly preferred refinement, the variable code is part of a predefined code sequence having a specified order.

This refinement has the advantage that the enable signal is transmitted in a continuous sequence of individual codes. In this case, the order can be implemented, for example, by an incremental counter which is transmitted with the variable code and which indicates the position inside the code sequence at which the code is arranged. An interruption in the code sequence or a change in the order can be detected by the second processing unit and results in the outputs being switched off by the second processing unit by suspending the dynamic clock signal. In this manner, the activation of the safe outputs can be linked to a further condition.

In a further refinement, the second processing unit provides the dynamic clock signal for a defined period of time based on the variable code.

According to this refinement, the requirements for the provision of the dynamic clock signal are further increased. The dynamic clock signal is generated by the second processing unit only if a code arrives at the second processing unit regularly, i.e. within a predetermined interval. In this manner, the enable signal must be continuously confirmed by the superordinate control unit. If there is no confirmation, the output unit switches off the safe outputs since no dynamic clock signal is generated.

It goes without saying that the features mentioned above and the features yet to be explained below can be used not only in the respectively stated combination but also in other combinations or alone without departing from the scope of the present invention.

BRIEF DESCRIPTION OF THE DRAWINGS

Exemplary embodiments of the invention are illustrated in the drawing and are explained in more detail in the following description. In the drawing.

DESCRIPTION OF PREFERRED EMBODIMENTS

Figure 1:
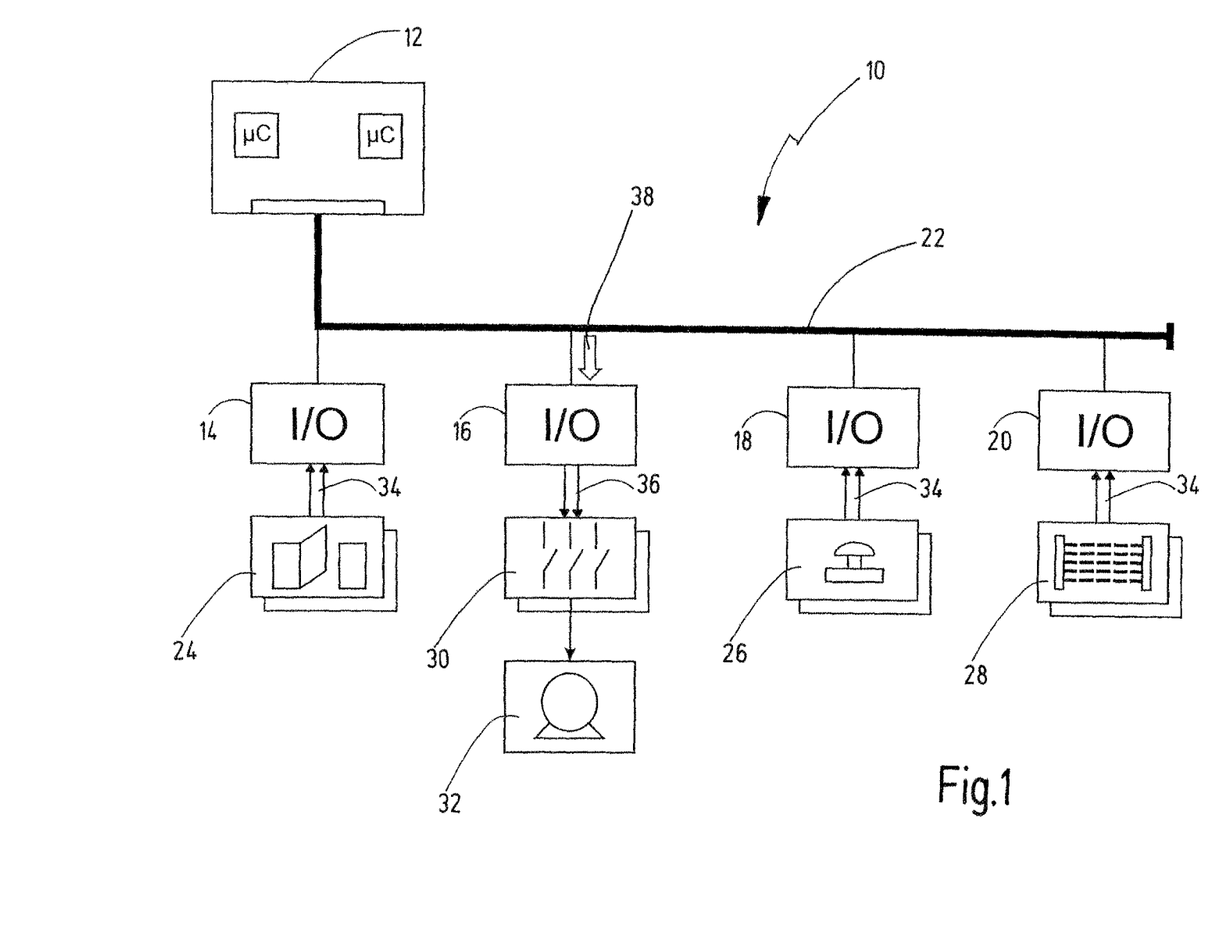
FIG. 1 shows a schematic depiction of an exemplary embodiment of the new system in the form of a block diagram.

In FIG. 1, an exemplary embodiment of a system according to the present invention is denoted in its entirety using the reference numeral 10.

The system 10 according to the present example comprises a control unit 12 having four I/O units 14, 16, 18, 20 connected thereto. The control unit is, for example, a failsafe programmable logic controller (PLC), as marketed for instance by the applicant under the name of PSS®.

The I/O units 14-20 are spatially remote from the control unit 12 and are connected to the latter via a single-channel data transmission path 22. The data transmission path 22 may be a conventional field bus. Single-channel means that the data transmission path 22 itself does not have any redundant hardware components, in particular no redundant cabling, which would allow a safe transmission of signals in a safety-critical manner. Preferably, the data transmission path 22 is an Ethernet data connection based on a commercially available Ethernet protocol.

In comparison with the multi-channel control unit 12, the I/O units 14-20 are simple units having inputs and/or outputs which are used substantially to receive and/or output signals, in particular, to readout sensors and to control actuators. A plurality of guard doors 24, emergency off switches 26 and light grids 28 are illustrated as examples of sensors for the typical application. Contactors 30 which can usually interrupt the supply of current to a machine 32 to be monitored are indicated here as actuators. According to the exemplary embodiment according to FIG. 1, separate units are provided for outputs and inputs. However, in contrast to this simplified illustration, the I/O units 14-20 may also be combined input and output units.

The inputs and outputs states of the I/O units 14-20 are referred to as process data. The process data are preferably cyclically interchanged between the I/O units 14-20 and the control unit 12. In the present exemplary embodiment, the control unit 12 evaluates, for example, the input signals 34 received from the sensors 24, 26, 28 via the input units 14, 18, 20 and provides corresponding output signals 36 for controlling the actuators 30 via the output unit 16. In addition to the output unit 16 shown here, a plurality of output units may be connected to the single-channel data transmission path in other exemplary embodiments. The order in which the I/O units are arranged is likewise only exemplary. Input signals 34 are assigned to the outputs in the control unit 12.

For safety-critical applications, error-free transmission of the process data via the single-channel data transmission path 22 has to be ensured. In particular, errors such as loss, repetition, corruption, insertion and modification of the order must be avoided in order to ensure that a signal received from a sensor results in a corresponding change at the actuators. In the exemplary embodiment according to FIG. 1, the control unit 12 and the I/O units 14-20 are adjusted to one another for this purpose in such a manner that, in the case of errors on the data transmission path 22, the machine 32 to be monitored is also safely switched off.

For this purpose, the signals 34 are transmitted on the input side from the I/O units 14-20 to the control unit 12, for example by way of diversitary multiple transmission, that is to say, in a preferred exemplary embodiment, the data are transmitted a first time in plain text and a second time in a encoded form predetermined by the control unit 12. Since the control unit 12 specifies the coding in this exemplary embodiment, failsafe reading in of the input signals from the sensors via the data transmission path 22 can be enabled in this manner. In this manner, the above-mentioned errors during transmission can be controlled, at least on the input side. Alternatively, however, it is also possible to use a different safe type of transmission for reading in the input signals 34 via the single-channel data transmission path 22.

According to one aspect of the present disclosure, the actuators 30 are likewise controlled here on the output side only via the single-channel data transmission path 22. For this purpose, the control unit 12 generates based on one or more input signals 34 an enable signal 38 in the form of a digital control command, which is transmitted to the output unit 16 via the single-channel data transmission path. The output unit 16 has a first processing unit and a second processing unit which carry out signal processing steps which differ from one another. The first processing unit processes the digital control command of the enable signal 38 at a logical level and generates based on the enable signal 38 an output signal which can be used to switch the contactors 30, more generally the actuators, on or off. In some exemplary embodiments, the first processing unit 40 can take into account further control commands during the logical processing of the control command from the enable signal 38, for instance a further control command from another control unit (not illustrated here) of the system 10 or a locally generated control command. In addition, the first processing unit 40 provides the enable signal 38 to the second processing unit 42. As described in more detail below, the second processing unit generates a dynamic clock signal for a defined period if the enable signal 38 is up-to-date in terms of time. In advantageous exemplary embodiments, the second processing unit does not evaluate the contents of the control command in the enable signal 38, but rather checks only the up-to-dateness of the enable signal 38 received via the data transmission path 22. Both the output signal from the first processing unit 40 and the dynamic clock signal from the second processing unit 42 must be present for the actuators 30 to be able to switch on a hazardous plant. Therefore, the safe outputs of the output unit are activated only if both signals are present. Since two independent output signals are generated from the enable signal, the above-mentioned transmission errors with regard to safe switching off can be controlled. An additional switch off path and local safe outputs respectively are not required.

Preferred exemplary embodiments of a control unit 12, an output unit 16 and an enable signal 38 in the meaning of the disclosure are explained in more detail below using FIGS. 2, 3 and 4. In this case, the same reference symbols denote the same parts as in the exemplary embodiment according to FIG. 1.

Figure 2:
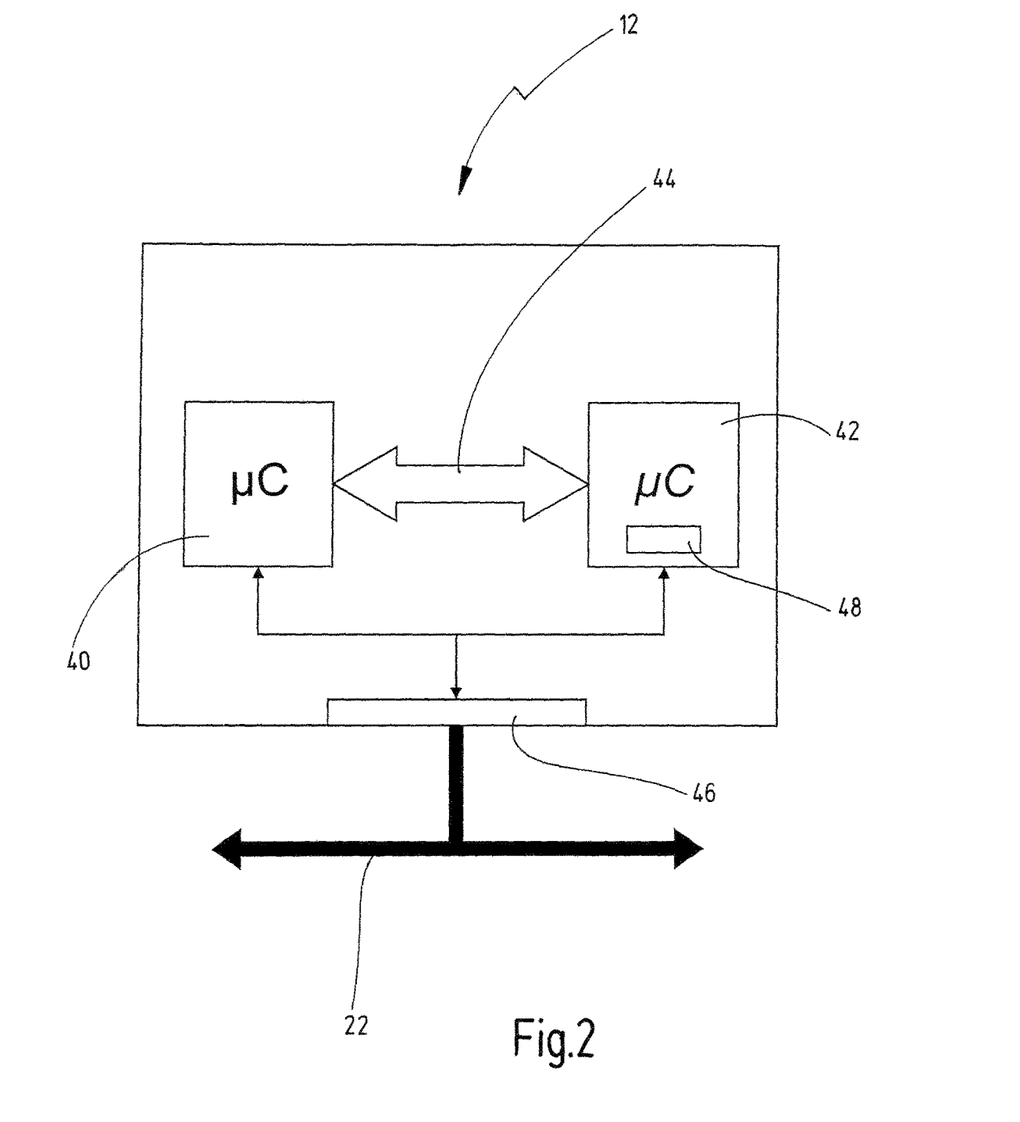
FIG. 2 shows a schematic depiction of a preferred exemplary embodiment of a control unit.

FIG. 2 schematically shows an exemplary embodiment of a control unit 12. Here, the control unit 12 is designed with multi-channel redundancy and processes all input data from the sensors 24, 26, 28 in a complete redundant manner in order to ensure the required intrinsic fail-safety. The redundant signal processing channels are denoted here in a simplified manner by two microcontrollers 40, 42 which substantially carry out the same processing steps, interchange results via a connection 44 and therefore mutually control one another. The connection 44 may be implemented as a dual-port RAM, for example, but may also be implemented in any other manner. In one preferred exemplary embodiment, the microcontrollers 40, 42 have different designs, as is indicated here by the italicized labeling of the second microcontroller 42. As a result of the different designs, a systematic error in the individual processing channels having identical functions can be excluded.

The control unit 12 has also a communication interface 46, via which the microcontrollers 40, 42 can access the data transmission path 22. The communication interface 46 is preferably a protocol chip which implements the corresponding protocol for cyclically transmitting data via the single-channel data transmission path.

The control unit 12 is designed to continuously read in input signals via the single-channel data transmission path 22 and to evaluate them with multi-channel redundancy using the microcontrollers 40, 42. Both microcontrollers 40, 42 cyclically generate control commands for the actuators based on the evaluation. Such a control command may represent an enable signal for switching on a hazardous movement of the machine 32 if the input signals from the sensors 24, 26, 28 indicate a safe state. Like conventional process data, the enable signal 38 is transmitted to the output units via the single-channel data transmission path. In one preferred exemplary embodiment, the enable signal is a data word which has a defined number of bits and is transmitted to the output unit 16 in a cyclically recurrent manner.

In the preferred exemplary embodiment according to FIG. 2, the control unit 12 also has an encoding unit 48 which is designed to manipulate the enable signal 38 with each processing cycle in such a manner that its up-to-dateness can be very quickly and easily checked by the output unit 16. For example, a first bit sequence could indicate a first state and a second bit sequence which differs from the first could indicate a second state. Alternatively or additionally, the encoding unit 48 could impress a predefined order on the cyclically transmitted enable signal, for instance by incrementally increasing a counter included in the data message. Preferably, each data message including an enable signal differs from the previous transmitted data message including the enable signal, wherein the predefined order is determined by the individual enable signals. As shown in FIG. 2, the encoding unit 48 can be integrated in one of the two microcontrollers as a software or hardware component. Alternatively, the encoding can also be carried out in both microcontrollers or by a separate component.

Figure 3:
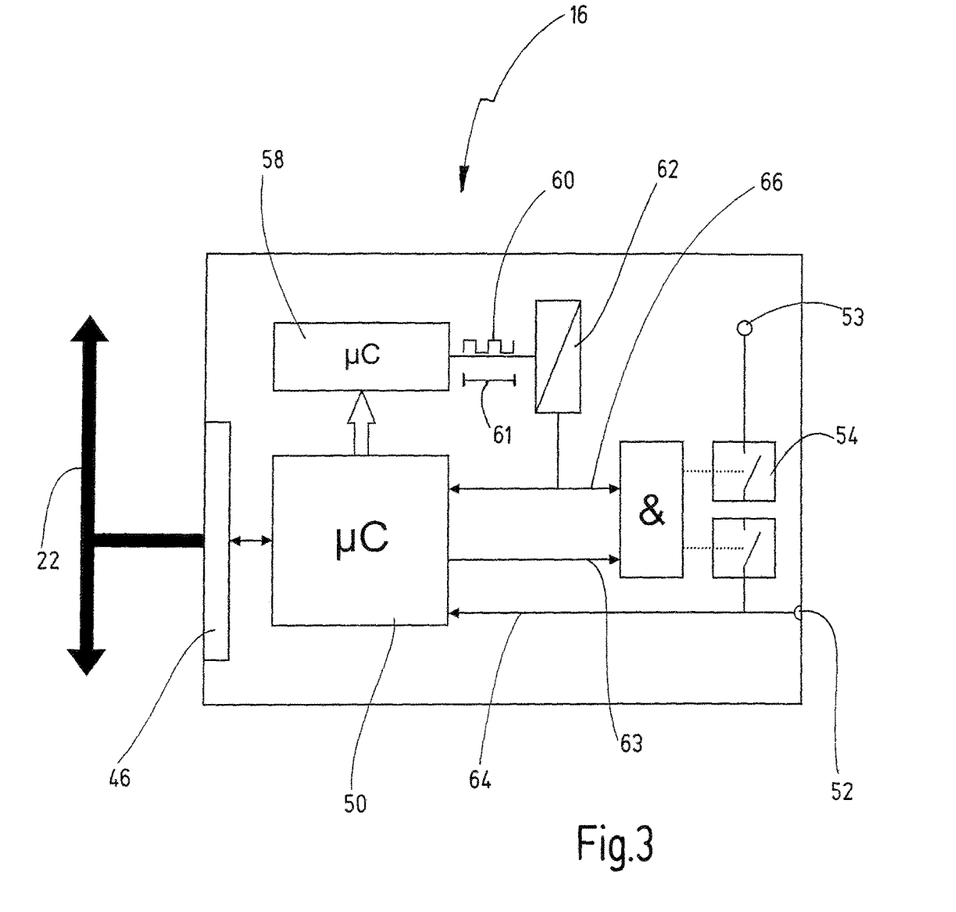
FIG. 3 shows a schematic depiction of a preferred exemplary embodiment of an output unit.

FIG. 3 shows an advantageous exemplary embodiment of an output unit 16 based on the I/O unit 16. Just like the control unit 12, the output unit here has a communication interface 46, via which a first processing unit 50 can access the data transmission path 22. Alternatively, the communication interface 46 may also be integrated in the first processing unit 50. In preferred exemplary embodiments, only one processing unit in the output unit 16 is directly connected to the data transmission path 22 and communicates with the control unit 12.

In the present exemplary embodiment, the first processing unit 50, which may be in the form of a microcontroller, an ASIC or an FPGA for example, cyclically receives the enable signal 38 and evaluates the contents thereof. That is, the first processing unit 50 logically interprets the control command contained in the enable signal 38 and generates based thereof and possibly further information an analog output signal 36 for controlling an output 52. The further information may be advantageously control commands from a further control unit (not illustrated here) in the overall plant. Furthermore, in advantageous exemplary embodiments, the further information may be input information from sensors locally present in the region of the output unit 16. This may be the case, in particular, if the output unit 16 is a combined input/output unit which both reads in input signals from sensors and controls actuators.

In addition, the first processing unit 50 provides here the enable signal 38 to a second processing unit 58 via an internal connection 56 here. The internal connection 56 is a one-way connection in which only data from the first processing unit 50 is transmitted to the second processing unit 58. Therefore, in the preferred exemplary embodiments, the second processing unit cannot transmit any data via the data transmission path. The second processing unit 58 is preferably likewise a microcontroller, an ASIC, an FPGA or another signal processing module which, however, has a reduced set of functions in comparison with the first processing unit 50. In one preferred embodiment, it is a minimized controller having only one input, a CPU and one output. The input may be a simple UART interface, via which the second processing unit 58 receives the enable signal 38 from the first processing unit 50, while the output may be a simple digital output, via which a dynamic clock signal 60 is provided. In one particularly preferred exemplary embodiment, the dynamic clock signal 60 is generated only for a limited defined period of time 61 after receiving the enable signal 38. If the second processing unit 58 does not receive a further valid enable signal 38 in this defined period of time, the dynamic clock signal is suspended. This way it is ensured that the enable signal has to be continuously confirmed by the control unit 12. In the preferred exemplary embodiments, the defined period of time 61 is somewhat longer than the cycle time T, with which the control unit 12 reads in the input signals and generates the cyclical enable signal 38, yet less than twice the cycle time T.

The second processing unit 58 therefore substantially checks the up-to-dateness of the enable signal 38. In the preferred exemplary embodiments, however, it does not evaluate the control command included in the enable signal 38. It therefore operates independently of the first processing unit 50 which substantially logically evaluates the enable signal 38 and, in particular, logically processes the control command included in the enable signal 38. If an up-to-date and therefore valid enable signal is present, the second processing unit 58 generates the dynamic clock signal 60 for the defined period of time 61.

The second processing unit 58 preferably evaluates metadata from the control unit 12 which is transmitted along with the enable signal 38 and may contain a state of a running counter or other cyclically changing data. In the present exemplary embodiment, an enable signal 38 is thus valid only if the enable signal 38 represents a defined state and corresponds to a predefined expectation of the second processing unit 58. Only in the case of an up-to-date enable signal 38 is the dynamic clock signal 60 generated and linked, via a converter element 62, to the first output signal 36, as indicated here by the logical AND symbol. The converter element 62 is preferably a rectifier which uses the dynamic clock signal 60 to generate a constant analog signal which is linked to the output signal 63 from the first processing unit 50.

The safe output 52 is activated via the linked signal from the first and second processing units 50, 58. In this exemplary embodiment, the linked signal controls two switching elements 54 which connect a power supply 53 to the safe output 52. If the switching elements are closed, i.e. both the output signal from the first processing unit and the dynamic clock signal from the second processing unit are present, the safe output 52 is energized and a connected actuator is active. In FIG. 1 only one safe output 52 is shown. Alternatively, a plurality of parallel outputs can also be controlled in this manner.

In this preferred exemplary embodiment, the output unit 16 is also designed to provide a feedback of the generated output signals. This is preferably carried out solely by the first processing unit 50. In the exemplary embodiment, inputs of the first processing unit 50 are connected to the safe output 52 via a first feed-back line 64, on the one hand, and are connected to the output of the converter element 62 via a second feed-back line 66, on the other hand. In some exemplary embodiments, the values which have been feedback are transmitted to the control unit 12, like input signals. In these exemplary embodiments, the control unit 12 can use the values which have been fed back to check the functionality of the individual components inside the output unit 16. For this purpose, the control unit 12 preferably carries out cyclical switch off tests by briefly changing or suspending the enable signal 38. The control unit 12 uses the values which have been fed back to determine whether or not a corresponding state change has occurred in the two enable paths.

Alternatively or additionally, the first processing unit 50 can itself evaluate the feed-back signals 64, 66 and, in particular, can logically link them to the respective control command from the cyclically transmitted enable signal 38.

Figure 4:
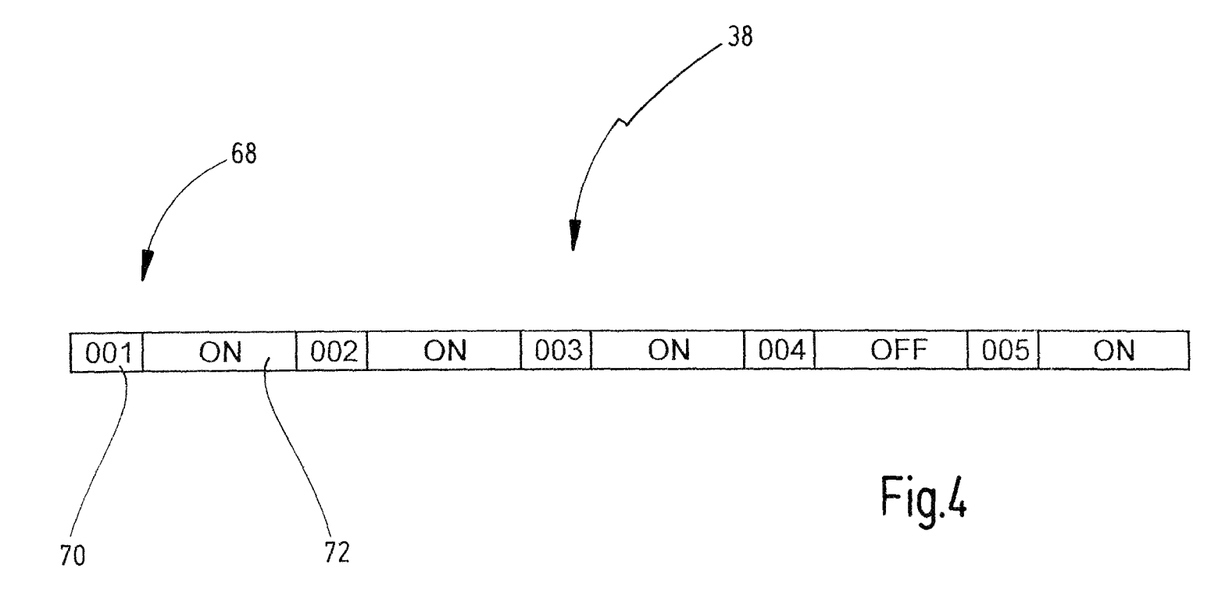
FIG. 4 shows a schematic depiction of a preferred embodiment of a code sequence for transmitting an enable signal.

FIG. 4 schematically shows an exemplary embodiment of an enable signal 38 which is transmitted in a cyclically repeated manner. The enable signal 38 is preferably a data message which is cyclically transmitted to the output units 16 in one or more packets. In the preferred exemplary embodiments, the transmission does not differ from the transmission of other process data. For the cyclical transmission, the enable signal 38 is illustrated here in a sequence of data words. In this exemplary embodiment, a data word 68 is composed of a first part 70 and a second part 72. In this exemplary embodiment, the first part 70 contains a state of a counter which is incrementally increased with each data message. This generates a predefined order which can be easily reconstructed and checked at the receiver end, in particular in the second processing unit 58. In this exemplary embodiment, the second part 72 encodes a control command for the actuator at the output unit 16. Here, the control command is ON in the first messages and OFF in the fourth message.

Figure 5:
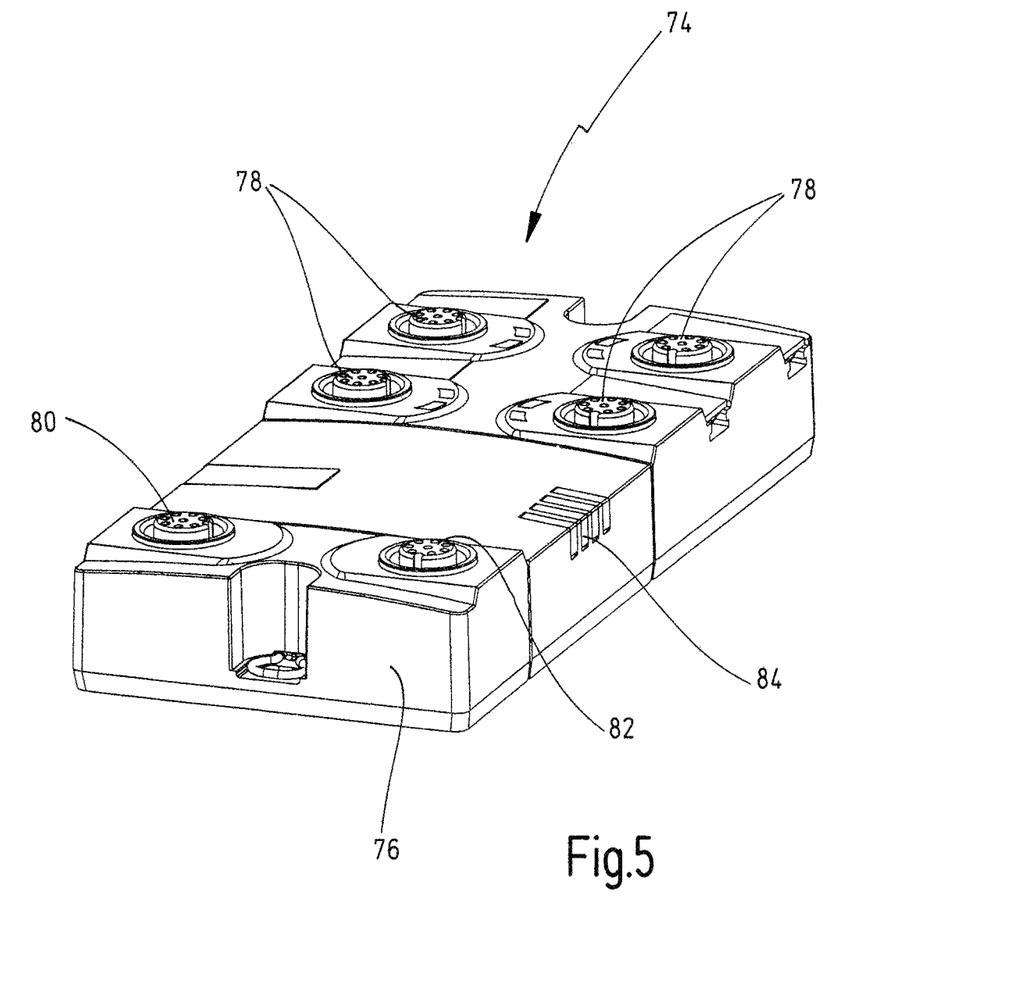
FIG. 5 shows a perspective depiction of an exemplary embodiment of a connection module.

FIG. 5 finally shows a particularly preferred exemplary embodiment of an I/O unit in which input and output units 14, 16 are combined in a functional assembly 74. The input and output units are integrated here in a waterproof housing 76 according to international protection marking IP 67. The respective connections for the inputs and outputs are routed out via plug sockets 78. Further connections 80, 82 are provided for the connection to the data transmission path.

Sensors and actuators are preferably connected to the functional assembly 74 via prefabricated cables. The data transmission path 22 is looped through via a first bus connection 80 and a second bus connection 82, with the result that a plurality of connection modules 74 can be connected in series to the data transmission path 22. The functional assembly 74 is particularly compact in size and, on account of the international protection marking IP67, it is preferably suitable for installation in the field outside of control cabinets. Additional indicators 84, for example in the form of LEDs, can directly indicate the respective state of the inputs and outputs at the functional assembly 74.

What is claimed is:

1. A method for safely switching off an electrical load in a system comprising a multi-channel control unit, a single-channel data transmission path and an output unit having a first processing unit, a second processing unit and safe outputs, the method comprising:
   receiving and evaluating an input signal by the multi-channel control unit and generating an enable signal based on the evaluation,
   transmitting the enable signal to the output unit via the single-channel data transmission path,
   receiving the enable signal by the first processing unit and generating an output signal based on the enable signal,
   providing at least one part of the enable signal from the first processing unit to the second processing unit for evaluation therewith,
   generating a dynamic clock signal by the second processing unit based on the enable signal,
   rectifying the dynamic clock signal to generate a constant analog signal which is linked to the output signal from the first processing unit, and
   controlling the safe outputs based on the linked signal.

2. The method of claim 1, further comprising:
   generating a feed-back message by the first processing unit based on the output signal and the dynamic clock signal,
   transmitting the feed-back message to the multi-channel control unit via the single-channel data transmission path.

3. The method of claims 1, wherein the enable signal comprises a variable code and the second processing unit generates the dynamic clock signal based on the variable code.

4. The method of claim 3, wherein the variable code is part of a predefined code sequence of a specific order.

5. The method of claims 3, wherein the second processing unit is providing the dynamic clock signal for a defined period of time based on the variable code.

6. A system for safely switching off an electrical load comprising:
   a multi-channel control unit for receiving and evaluating an input signal,
   a single-channel data transmission path,
   an output unit having a first processing unit, a second processing unit, safe outputs, and a converter element,
   wherein the multi-channel control unit is connected to the output unit via the single-channel data transmission path,
   wherein the multi-channel control unit is configured to generate an enable signal based on the input signal,
   wherein the single-channel data transmission path is configured to transmit the enable signal from the control unit to the output unit,
   wherein the first processing unit is configured to generate an output signal based on the enable signal and to also at least partially provide the enable signal to the second processing unit for evaluation therewith,
   wherein the second processing unit is configured to generate a dynamic clock signal based on the enable signal,
   wherein the converter element is configured to rectify the dynamic clock signal to generate a constant analog signal which is linked to the output signal from the first processing unit, and
   wherein the output unit is configured to control the safe outputs based on the linked signal.

7. The system of claim 6, wherein the first processing unit is configured to
   generate a feed-back message based on the output signal and the dynamic clock signal, and
   transmit the feed-back message to the multi-channel control unit via the single-channel data transmission path.

8. The system of claim 6, wherein the enable signal comprises a variable code and the second processing unit is configured to generate the dynamic clock signal based on the variable code.

9. The system of claim 8, wherein the variable code is part of a predefined code sequence of a specific order.

10. The system of claim 8, wherein the second processing unit is configured to provide the dynamic clock signal for a defined period of time based on the variable code.

11. An output unit in a system for safely switching off an electrical load comprising a multi-channel control unit for receiving and evaluating an input signal and a single-channel data transmission path, the output unit having a first processing unit, a second processing unit, safe outputs and a converter element,
   wherein the first processing unit is configured to generate an output signal based on an enable signal and to also at least partially provide the enable signal to the second processing unit for evaluation therewith, the enable signal being generated by the multi-channel control unit based on the evaluation of the input signal and being transmitted via the single-channel data transmission path from the multi-channel control unit to the output unit,
   wherein the second processing unit is configured to generate a dynamic clock signal based on the enable signal,
   wherein the converter element is configured to rectify the dynamic clock signal to generate a constant analog signal which is linked to the output signal from the first processing unit, and
   wherein the output unit is also configured to control the safe outputs based on the output signal and the dynamic clock signal.

* * * * *